United States Patent
Sze et al.

(10) Patent No.: US 12,441,897 B2
(45) Date of Patent: Oct. 14, 2025

(54) POLYAMIDOAMINE DISPERSANTS

(71) Applicant: Evonik Operations GmbH, Essen (DE)

(72) Inventors: Ming Choon Sze, Singapore (SG); Sunil Shinde, Singapore (SG); Haihua Tang, Singapore (SG); Kerh Li Liu, Singapore (SG); Christoph Dürr, Monheim am Rhein (DE)

(73) Assignee: Evonik Operations GmbH, Essen (DE)

( * ) Notice: Subject to any disclaimer, the term of this patent is extended or adjusted under 35 U.S.C. 154(b) by 977 days.

(21) Appl. No.: 17/382,008

(22) Filed: Jul. 21, 2021

(65) Prior Publication Data
US 2022/0025193 A1    Jan. 27, 2022

(30) Foreign Application Priority Data

Jul. 23, 2020  (EP) .................................... 20187363
Jun. 8, 2021   (EP) .................................... 21178165

(51) Int. Cl.
| | | |
|---|---|---|
| *C09D 7/00* | (2018.01) |
| *C08F 8/32* | (2006.01) |
| *C08F 220/18* | (2006.01) |
| *C08F 222/06* | (2006.01) |
| *C08G 63/91* | (2006.01) |
| *C08G 73/02* | (2006.01) |
| *C08K 5/19* | (2006.01) |
| *C09D 7/65* | (2018.01) |
| *C09D 17/00* | (2006.01) |

(52) U.S. Cl.
CPC ................. *C09D 7/65* (2018.01); *C08F 8/32* (2013.01); *C08F 220/1804* (2020.02); *C08F 222/06* (2013.01); *C08G 63/912* (2013.01); *C08G 73/028* (2013.01); *C08K 5/19* (2013.01); *C09D 17/002* (2013.01)

(58) Field of Classification Search
CPC .... C08F 220/1804; C08F 8/32; C08F 220/06; C08G 63/912; C08G 73/028; C08K 5/19

USPC ................ 106/31.01, 31.13, 31.85
See application file for complete search history.

(56) References Cited

U.S. PATENT DOCUMENTS

| | | | |
|---|---|---|---|
| 4,956,107 A | 9/1990 | Gutierrez et al. | |
| 10,113,025 B2 | 10/2018 | Duerr et al. | |
| 10,287,448 B2 | 5/2019 | Roland et al. | |
| 10,577,512 B2 | 3/2020 | Aitha et al. | |
| 2016/0289366 A1 | 10/2016 | Duerr et al. | |
| 2017/0190840 A1 | 7/2017 | Göbelt et al. | |
| 2017/0335154 A1* | 11/2017 | Pritschins | C09J 167/04 |
| 2018/0010007 A1 | 1/2018 | Roland et al. | |
| 2018/0094146 A1 | 4/2018 | Aitha et al. | |

FOREIGN PATENT DOCUMENTS

| | | |
|---|---|---|
| EP | 3074449 | 6/2017 |
| EP | 3943526 | 1/2022 |

OTHER PUBLICATIONS

Extended European Search Report dated Feb. 9, 2021 in European Application No. 20187363.5, 9 pages.

* cited by examiner

Primary Examiner — James E Mcdonough
(74) Attorney, Agent, or Firm — Grüneberg and Myers PLLC

(57) ABSTRACT

A pigment dispersant can be obtained by reacting amine-rich moieties C with at least one polymer P having one or more amine reactive groups. The amine-rich moieties C have an amine density of at least 600 mg KOH/g and are obtainable from repetitive self-reaction of at least one type of substance B and/or from cross-reaction of at least one B with at least one substance A. B is an adduct of at least one substance A and at least one linker D. The amine-reactive functionality in B and D are reacted with reactive amines in B and/or A; and if B has only one amine reactive group, then additional D and/or mixture of B and A is reacted to a previously formed C, where such an additional reaction of D and/or mixture of B and A to a formed C is repeated for 1 to 10 times.

20 Claims, No Drawings

POLYAMIDOAMINE DISPERSANTS

CROSS-REFERENCE TO RELATED APPLICATIONS

This application claims priority to European Patent Application No. 20187363.5, filed Jul. 23, 2020; and to European Patent Application No. 21178165.3, filed Jun. 8, 2021. The content of each of these applications is hereby incorporated by reference in its entirety.

BACKGROUND OF THE INVENTION

Field of the Invention

The present invention pertains to a non-PEI aminic pigment dispersants molecules, their production and use in coating formulation.

Description of Related Art

Polyethyleneimine (PEI) is a hyperbranched polyamine with one of the highest amine density possible in organic polymers. Commercial PEI has a high amine density of 1,000 mg KOH/g-1,400 mg KOH/g, a molecular weight ranging from 300 g/mol to 2,000,000 g/mol, as well as distribution of primary, secondary and tertiary amines in 25-35 mol %, 35-50 mol % and 20-30 mol %, respectively. They are supplied mainly by BASF and Nippon Shokubai, under the trade names of Luprasol and Epomin, respectively.

By virtue of its high amine density, especially the number of tertiary amines, and large size as well as hyperbranched structure, PEI has been used in production of high performance pigment dispersants. A typical design of such high-performance pigment dispersants is a combination of the amine-rich PEI sequences with stabilizing side chains, mainly of oligo- or polymeric character see e.g. U.S. Pat. No. 4,224,212.

The high amine density and large molecular size render PEI a strong pigment anchoring moiety while the hyperbranched structure endows it with large number of primary and secondary amines at the periphery of the molecules for ligation with binder interacting segments.

The presence of large amounts of amine in PEI, however, can be detrimental for certain applications. Modification of PEI to reduce the amine concentration by e.g. reaction with epoxides or carboxylic acids (U.S. Pat. Nos. 6,878,799, 8,362,300) can be done at the expense of consuming active amine sites that could be used for reaction with binder interacting segments.

Since dispersing agents are high performance additives, these chemical structures need to be tailor-made for the desired application to match the demanding requirements and to fulfill its roles in stabilizing the interfaces of pigment and the surrounding media.

In order to access such tailor-made structures, a means to modify the structure and composition of the amine-rich sections provides a high degree of freedom in the design of such structures and is highly desirable. From a commercial perspective, this freedom cannot be easily achieved based on the conventional protocols of PEI synthesis, as the highly toxic ethylene imine raw material is demanding with respect to the handling and the manufacturing processes and is not commercially viable for dispersing additives with its rather small-scale volumes due to its specialty purposes.

Despite the highly toxic ethylene imine raw material, replacing PEI altogether with other polyamines such as triethylenetetramine (TETA) and tetraethylenepentamine (TEPA) in the production of dispersants proved challenging and lead to products that suffer in performance for the lack of one or more of the special features of PEI mentioned above.

U.S. Pat. No. 8,202,935 discloses a modified PEI obtained via Michael reaction or amidation which uses the same toxic raw materials as mentioned before.

U.S. Pat. No. 7,348,367 discloses a PAMAM (Polyamidoamine) dendrimer. Dendrimer structures, however, are unsuitable as dispersant because they are expensive to produce as it involves a multistep synthesis that requires extensive purification in between steps and thus not viable for commercial application. In addition, PAMAM (Polyamidoamine) dendrimer structures are produced only using diamines and acrylates as raw materials and therefore have low amine density.

US 2016/10215160 discloses polyamidoamine epoxy crosslinkers and PAMAM dendrimer. Such polyamidoamine epoxy crosslinkers are small molecules and not suitable as a dispersant because of their low molecular weight and insufficient amine functionality.

CN 105315760 discloses ester-modified hyperbranched polyamidoamine that are used as dispersants which were found to not give the desired performance.

EP 3 074 449 B1 discloses polyamine addition compounds from short amines of 1-8 primary/secondary amine functionality linked together using acrylate or polyepoxy compounds. The amine density of such a molecule, however, is too low to yield satisfactory dispersant performance as the use of acrylate linker sacrificed to many amine functional groups while building up the polyamidoamine structure. This reduced amine density reduces the effectiveness in pigment anchoring.

WO 2012/175622 discloses a compound obtained by reacting an amine with an ester which can be further modified via amidation, alkoxylation and/or carboxylation. The compound is described as a general additive that can be used in coatings. The use of a process aid, i.e. water or ammonia, limits the growth of the resulting molecules and thus makes the compound suitable as a crosslinker. Such molecules, however, are not suitable for use in production of high performance dispersants.

SUMMARY OF THE INVENTION

It is thus an object of the present invention to provide high performance pigment dispersant molecules that can match the performance of PEI-based dispersants, without the practical limitation of PEI-based dispersants in making tailor-made structures and without having to handle highly toxic imine raw materials.

This object is achieved by a pigment dispersant obtained by reacting amine-rich moieties C with at least one polymer P, said polymer P having one or more amine reactive groups, characterized in that said amine-rich moieties C having an amine density of at least 600 mg KOH/g and said amine-rich moieties C being obtainable from repetitive self-reaction of at least one type of substance B and/or from cross-reaction of at least one B with at least one A; with B being an adduct of at least one substance A and at least one linker D and B containing 1-15 amine-reactive groups and 4-15 in total number of primary, secondary, tertiary and quaternary amines, A being a branched and/or linear aliphatic and/or cycloaliphatic or aromatic polyamine containing 4-15 total number of primary, secondary, tertiary and quaternary amines, Linker D being an acrylate, maleate/fumarate mono-ester or maleate/fumarate di-ester containing 1-15 amine-reactive groups or a mixture thereof;

the amine-reactive groups in B and D are reacted with reactive amines in B and/or A and if B has only one amine reactive group then additional D and/or mixture of B and A is reacted to a previously formed C, such additional reaction of D and/or mixture of B and A to a formed C is repeated for 1 to 10 times.

Adduct B containing 1-15 amine-reactive groups and 4-15 in total number of primary, secondary, tertiary and quaternary amines preferably contains 4-15 primary or secondary amines.

The invention also includes the following embodiments:

1. Pigment dispersant obtained by reacting amine-rich moieties C with at least one polymer P, said polymer P having one or more amine reactive groups, characterized in that said amine-rich moieties C having an amine density of at least 600 mg KOH/g and said amine-rich moieties C being obtainable from repetitive self-reaction of at least one type of substance B and/or from cross-reaction of at least one B with at least one A, with B being an adduct of at least one substance A and at least one linker D and B containing 1-15 amine-reactive groups and 4-15 in total number of primary, secondary, tertiary and quaternary amines, A being a branched and/or linear aliphatic and/or cycloaliphatic or aromatic polyamine containing 4-15 total number of primary, secondary, tertiary and quaternary amines, Linker D being an acrylate, maleate/fumarate mono-ester or maleate/fumarate di-ester containing 1-15 amine-reactive groups, or a mixture thereof;

the amine-reactive groups in B and D are reacted with reactive amines in B and/or A and if B has only one amine reactive group then additional D and/or mixture of B and A is reacted to a previously formed C, such additional reaction of D and/or mixture of B and A to a formed C is repeated for 1 to 10 times.

2. Pigment dispersant according to embodiment 1, characterized in that amine-rich moieties C having an amine density of 600 mg KOH/g to 1,000 mg KOH/g.

3. Pigment dispersant according to embodiment 2, characterized in that amine-rich moieties C having an amine density of 700 mg KOH/g to 1,000 mg KOH/g.

4. Pigment dispersant according to any one of embodiments 1 to 3, characterized in that P is a polyester or polyether or polyesterether or poly(meth)acrylate or a mixture thereof.

5. Pigment dispersant according to any one of embodiments 1 to 4, characterized in that P is a polylactone or polycaprolactone.

6. Pigment dispersant according to any one of embodiments 1 to 5, characterized in that substance B has 2 to 15 amine-reactive groups and additional D and/or mixture of B and A is reacted to a previously formed C, such additional reaction of D and/or mixture of B and A to a formed C is repeated for 1 to 10 times.

7. Pigment dispersant according to any one of embodiments 1 to 6, characterized in that A is selected from the group consisting of triethylenetetramine, tetraethylenepentamine and pentaethylenehexamine.

8. Pigment dispersant according to any one of embodiments 1 to 7, characterized in that the reaction product obtained by reacting amine-rich moieties C with at least one polymer P is further reacted with at least one substance Q selected from the group consisting of peroxides, alkyl halide, carboxylic acid, carboxylic ester, ketone, aldehyde, epoxide, isocyanate, uretdiones, carbodiimide, Michael acceptors or anhydride.

9. Pigment dispersant according to embodiment 8, characterized that Q is an anhydride.

10. Process for producing a pigment dispersant comprising the steps of
    a) repetitive self-reaction of at least one type of substance B and/or cross-reaction of at least one B with at least one A to produce amine-rich moieties C having an amine density of at least 600 mg KOH/g, with B being an adduct of at least one substance A and at least one linker D and B containing 1-15 amine-reactive groups and 4-15 in total number of primary, secondary, tertiary and quaternary amines, A being a branched and/or linear aliphatic and/or cycloaliphatic or aromatic polyamine containing 4-15 total number of primary, secondary, tertiary and quaternary amines, Linker D being an acrylate, maleate/fumarate mono-ester or maleate/fumarate di-ester containing 1-15 amine-reactive groups, or mixture thereof;

the amine-reactive groups in B and D are reacted with reactive amines in B and/or A and if B has only one amine reactive group then additional D and/or mixture of B and A is reacted to a previously formed C, such additional reaction of D and/or mixture of B and A to a formed C is repeated for 1 to 10 times, b) reacting the amine-rich moieties C with at least one polymer P, said polymer P having one or more amine reactive groups.

11. Process for producing a pigment dispersant according to embodiment 10, characterized in that amine-rich moieties C having an amine density of 600 mg KOH/g to 1,000 mg KOH/g.

12. Process for producing a pigment dispersant according to embodiment 10 or 11, characterized in that P is a polyester or polyether or polyesterether or poly(meth)acrylate or a mixture thereof.

13. Process for producing a pigment dispersant according to embodiment 12, characterized in that P is a polylactone or polycaprolactone.

14. Process for producing a pigment dispersant according to any one of embodiments 10 to 13, characterized in that substance B has 2 to 15 amine-reactive groups and additional D and/or mixture of B and A is reacted to a previously formed C, such additional reaction of D and/or mixture of B and A to a formed C is repeated for 1 to 10 times.

15. Process for producing a pigment dispersant according to any one of embodiments 10 to 14, characterized in that A is selected from the group consisting of triethylenetetramine, tetraethylenepentamine and pentaethylenehexamine.

16. Process for producing a pigment dispersant according to any one of embodiments 10 to 15, characterized in that the reaction product of amine-rich moieties C and at least one polymer P is reacted with substance Q selected from the group consisting of peroxides, alkyl halide, carboxylic acid, carboxylic ester, ketone, aldehyde, epoxide, isocyanate, uretdiones, carbodiimide, Michael acceptors or anhydride.

17. Process for producing a pigment dispersant according to embodiment 16, characterized in that substance Q is an anhydride.

DETAILED DESCRIPTION OF THE INVENTION

The term "amine-reactive group" describes a functional group that can react with an amine. Amine reactive groups are preferably acid groups, ester groups, ketone groups, aldehyde groups, epoxy groups, isocyanate groups, uretdiones groups, carbodimide groups, Michael acceptors or anhydride groups. Michael acceptors are substances with ethylenic or acetylenic moieties that are next to electron withdrawing group such as ketone, ester or nitrile. Most preferred amine reactive groups are ester groups or Michael acceptors.

The term "reactive amines" means primary or secondary amines. It is preferred that B and/or A comprises each at least one primary or secondary amine out of the 4-15 in total number of primary, secondary, tertiary and quaternary amines. More preferably B comprises at least one primary or secondary amine and A comprises at least two primary or secondary amines. Most preferably B comprises at least four primary or secondary amines and A comprises at least four primary or secondary amines.

Polyamine A is preferably smaller than 600 Dalton, more preferably smaller than 500 Dalton and most preferably smaller than 300 Dalton and it preferably contains 4-15 primary or secondary amines.

The formation of C by repetitive self-reaction of at least one type of substance B and/or cross-reaction of at least one B with at least one A happens once B is formed as an adduct of linker D and polyamine A. The then formed B comprises amine reactive groups and amines and can thus self-react to form C or cross react with unconsumed or added polyamine A. The skilled person can choose a suitable temperature to enable the self-reaction of B and/or cross-reaction of B with A. It is preferred that the formation of C by repetitive self-reaction of at least one type of substance B and/or cross-reaction of at least one B with at least one A is carried out at a temperature above 115° C., more preferably above 130° C. In order to avoid unwanted side reactions, the temperature should preferably remain below 230° C., more preferably below 200° C.

It is preferred that the amine-reactive groups in B and D are substantially reacted with reactive amines in B and/or A meaning these groups are reacted so that the structure of C can be built up, more preferably it means these groups are reacted close to 100% or most preferably fully reacted with primary or secondary amines.

In case adduct B has only one amine reactive group the proviso applies to react additional D and/or mixture of B and A for 1 to 10 times to a previously formed C. Adduct B has only one amine reactive group if linker D is an acrylate. If adduct B has more than one amine reactive group, the additional reaction of D and/or mixture of B and A to a formed C for 1 to 10 times is optional.

Adduct B can be an intermediate that is formed by reacting linker D and substance A which then self-reacts or reacts with remaining substance A to form amine rich polyamidoamine C or adduct B can be formed first in a reaction of D and A and in a separate step is self-reacted and/or reacted with A to form amine rich polyamidoamine C.

Surprisingly it was found according to the present invention that polyamidoamine can have similar performance as PEI for the production of a dispersant despite the lower amine content.

Linker D being an acrylate, maleate/fumarate mono-ester or maleate/fumarate di-ester containing 1-15 amine-reactive groups or a mixture thereof. Preferably linker D is maleate/fumarate di-ester containing 1-15 amine-reactive groups. In another preferred embodiment linker D contains one or more Michael acceptor and one or more carboxylic acid and/or carboxylate ester and/or anhydride moieties The molar ratio between polyamine A and linker D dictates the size of resultant polyamidoamine. Bearing in mind the multifunctionality of both polyamine and linker, the ratio of polyamine A and linker D should be kept at a level that gives optimum size build-up without gelation. However, with increased amount of linker used, the amine density of the resultant adduct B (polyamidoamine) becomes lesser. The amine values of such reaction products are typically lower than PEI of which the extent will depend on the ratio of polyamine to linker. Surprisingly, it was found that polyamidoamine with much lower amine density than PEI, in the range of 600-1,000 mg KOH/g can be effectively used in dispersant synthesis.

|  | PEI | Polyamidoamine (TEPA-Acrylate) | Polyamidoamine (TEPA-Maleate) |
| --- | --- | --- | --- |
| Amine density (mg KOH/g) | 1,000-1,400 | 700-800 | 800-900 |

A pigment dispersant obtained from amine-rich moieties C having an amine density of 600 mg KOH/g to 1,000 mg KOH/g is thus preferred.

More preferred is a pigment dispersant, characterized in that the amine-rich moieties C having an amine density of 700 mg KOH/g to 1,000 mg KOH/g and most preferred is an amine density of 700 mg KOH/g to 900 mg KOH/g.

The molecular weight of polymer P preferably lies between 1,000 Da and 10,000 Da. The number of amine reactive groups in polymer P preferably ranges from 1-100, more preferably from 10 to 100.

Polymer P having amine reactive groups is preferably selected from the group consisting of polyester, polyether, polyesterether, poly(meth)acrylate or a mixture thereof. More preferably, Polymer P is a polyester. Most preferably, Polymer P is a polylactone or polycaprolactone.

In another preferred embodiment of the invention the pigment dispersant is characterized in that adduct B has 2 to 15 amine-reactive groups and additional D and/or mixture of B and A is reacted to a previously formed C, such additional reaction of D and/or mixture of B and A to a formed C is repeated for 1 to 10 times.

Polyamine A is preferably selected from the group consisting of triethylenetetramine, tetraethylenepentamine and pentaethylenehexamine.

The reaction product obtainable from amine-rich moieties C and at least one polymers P could be optionally modified by reacting it with at least one substance Q. The incorporation of Q serves to introduce additional pigment or binder interacting moieties to the dispersant molecules. Substance Q is a non-polymeric molecule selected from the group consisting of peroxides, alkyl halide, carboxylic acid, carboxylic ester, ketone, aldehyde, epoxide, isocyanate, uretdiones, carbodiimide, Michael acceptors or anhydride. Substance Q is preferably an anhydride.

The present invention also pertains to a process for producing a pigment dispersant comprising the steps of
a) repetitive self-reaction of at least one type of substance B and/or cross-reaction of at least one B with at least one A to produce amine-rich moieties C having an amine density of at least 600 mg KOH/g, with B being an adduct of at least one substance A and at least one linker D and B containing 1-15 amine-reactive groups and 4-15 in total number of primary, secondary, tertiary and quaternary amines, substance A being a branched and/or linear aliphatic and/or cycloaliphatic or aromatic polyamine containing 4-15 total number of primary, secondary, tertiary and quaternary amines, Linker D being an acrylate, maleate/fumarate mono-ester or maleate/fumarate di-ester containing 1-15 amine-reactive groups, or a mixture thereof;

the amine-reactive groups in B and D are reacted with reactive amines in B and/or A and if B has only one amine reactive group then additional D and/or mixture of B and A is reacted to a previously formed C, such additional reaction of D and/or mixture of B and A to a formed C is repeated for 1 to 10 times.

b) reacting the amine-rich moieties C with at least one polymer P having one or more amine reactive groups and optionally reacting the reaction product of amine-rich moieties C and at least one polymer P with substance Q.

It is preferred in the process for producing a pigment dispersant that amine-rich moieties C have an amine density of 600 mg KOH/g to 1,000 mg KOH/g It is further preferred in the process for producing a pigment dispersant that polymer P is selected from the group consisting of polyester, polyether, polyesterether, poly(meth)acrylate or a mixture thereof. More preferably, Polymer P is a polyester. Most preferably, Polymer P is a polylactone or polycaprolactone.

It is further preferred in the process for producing a pigment dispersant that substance Q is a non-polymeric molecule selected from the group consisting of peroxides, alkyl halide, carboxylic acid, carboxylic ester, ketone, aldehyde, epoxide, isocyanate, uretdiones, carbodiimide, Michael acceptors or anhydride. Substance Q is preferably an anhydride.

In another preferred embodiment of the inventive process for producing a pigment dispersant, adduct B has 2 to 15 amine-reactive groups and additional D and/or mixture of B and A is reacted to a previously formed C, such additional reaction of D and/or mixture of B and A to a formed C is repeated for 1 to 10 times.

In yet another preferred embodiment of the process for producing a pigment dispersant Polyamine A is selected from the group consisting of triethylenetetramine, tetraethylenepentamine and pentaethylenehexamine Examples The following examples describe the invention and the synthesis of component C and final dispersant in more detail and should not be construed as limiting in any way.
a) Synthesis of Amine-Rich Moieties C (A=TEPA; D: Maleate Monoester, Maleate Diester)
1. Linker molecule Diethylmaleate (D) was mixed with polyamine TEPA (A) at room temperature, forming an intermediate B. The mixing rate was regulated such that temperature of reaction mixture did not exceed 60° C.
2. Upon complete mixing of D and A, the mixture of B with/without A was heated to 145° C. and held for 6 hours, during which self-condensation of B and/or cross-condensation of B and A was carried out.

Route 1 (A=TEPA; D: Diethylmaleate)
1. Diethylmaleate was added into TEPA at room temperature. The addition rate was regulated such that temperature of reaction mixture did not exceed 60° C.
2. Upon complete addition of diethylmaleate, the mixture was heated to 145° C. and hold for 6 hours, whereby ester functionality of diethylmaleate has been consumed.

Route 2 (A=TEPA; D: Monoethylmaleate)
1. Maleic anhydride was first added into excess ethanol at 60° C. The reaction was held for 2 hours and mixture containing monoethylmaleate and ethanol was cooled to room temperature.
2. TEPA was added to the mixture at room temperature. The addition rate was regulated such that temperature of reaction mixture did not exceed 80° C.
3. Upon complete addition of TEPA, the mixture was heated to 145° C. and held for 6 hours, whereby ester functionality of monoethylmaleate has been consumed.

b) Synthesis of Amine-Rich Moieties C Using Acrylate (A=TEPA, D: Butylacrylate)
1. Butyl acrylate was added into TEPA at room temperature. The addition rate was regulated such that temperature of reaction mixture did not exceed 60° C.
2. Upon complete addition of butyl acrylate, the mixture was heated to 145° C. and held for 6 hours, whereby ester functionality of butyl acrylate has been consumed.
3. The mixture was cooled down to 100° C. and mixed with fresh of butyl acrylate-TEPA adduct formed at room temperature according to step 1. The mixture was again heated to 145° C. and held for 6 hours, whereby ester functionality of butyl acrylate has been consumed. This step could be repeated another 1-9 times.

c) Synthesis of Final Dispersant
Poplycaprolactone (P) was mixed with amine-rich moieties C at weight ratios of 100:1 to 1:100 and heated to 120° C. and then held at such temperature for 6 hours and thereby linked to amine-rich moieties C through covalent or non-covalent bond formation.

The resultant dispersants were tested in solvent-borne coil coating formulation with carbon black FW200 pigment. Carbon black pigment was selected in the testing as it is one of the most difficult pigments to disperse in coating formulations. Poor dispersion of the pigment leads to poor color strength development. Hence, a critical performance indicator for the dispersant is the color strength of tinted paint and a value of greater than 115 is deemed as good performance.

Color Strength is a measurement of the ability of a pigment to absorb incident light and color a medium. It has practical importance in coloring white base paint: the stronger (higher F value) the tinting color the more cost-effective it is.

The color strength obtained with a PEI-based dispersant (SP-018, Nippon Shokubai, molecular weight 1,800 Dalton) is used as benchmark.

Color strength measurement: Color strength, F, of the coating film was computed from the Y value (CIE 1931 XYZ) based on the modified version of the Kubelka-Munk equation. Y value was obtained using a spectrophotometer (Konica Minolta, CM600D) that determine tristimulus X, Y, Z values or L*, a* and b* values which correspond to lightness, undertone on the red/green scale and undertone on the yellow/blue scale, respectively. ΔF from PEI-based benchmark is the deviation of F of respective example from benchmark (Ex 1) and expressed in percentage.

TABLE 1

Color strength performance of dispersants according to the
invention and PEI-based/comparative dispersants

| Ex | A | D | A/D | N | Amine density of C (mgKOH/g) | P | wt % P | Color strength F (>115 required) | ΔF from PEI-based benchmark |
|---|---|---|---|---|---|---|---|---|---|
| 1 | PEI | — | — | 0 | — | PCL | 91 | 121 | — |
| 2 | TEPA | Butyl acrylate | 1.05 | 0 | 796 | PCL | 91 | 111 | −8.3% |
| 3 | DETA | Diethyl maleate | 2.17 | 0 | 834 | PCL | 91 | 109 | −9.9% |
| 4 | TEPA | Butyl acrylate | 1.05 | 1 | 796 | PCL | 91 | 117 | −3.3% |
| 5 | TEPA | Butyl acrylate | 1.05 | 3 | 796 | PCL | 91 | 122 | +0.8% |
| 6 | TEPA | Diethyl maleate | 2.17 | 0 | 855 | PCL | 91 | 119 | −1.7% |
| 7 | TEPA | Diethyl maleate | 2.17 | 1 | 855 | PCL | 91 | 122 | +0.8% |
| 8 | TEPA | Diethyl maleate | 2.17 | 2 | 855 | PCL | 91 | 125 | +3.3% |
| 9 | TEPA | Monoethyl maleate | 2.17 | 0 | 855 | PCL | 91 | 119 | −1.7% |
| 10 | TEPA | Monoethyl maleate | 2.17 | 1 | 855 | PCL | 91 | 122 | +0.8% |
| 11 | TEPA | Monoethyl maleate | 2.17 | 2 | 855 | PCL | 91 | 124 | +2.5% |

Table 1 shows the color strength performance of a PEI based dispersant, comparative dispersants based on acrylate or maleate linker and a polyamine containing less than 4 amines as well as dispersants according to the invention.

Polyamine A (TEPA or DETA) and linker D are first reacted to form substance B. As described above under "Synthesis of amine-rich moieties C" said amine rich moiety C is then formed by repetitive self-reaction of B and cross reaction of B with unconsumed polyamine A.

In general, the skilled person is free to choose the molar ratio of polyamine A and linker D (A/D) in the reaction mixture as long as C reaches the required amine density above 600 mg KOH/g. As can be seen in table 1 all reaction mixtures of A/D shown in examples 2 to 11 result in C with an amine density above 600 mg KOH/g as required according to the invention.

Example 1 shows the results for a PEI based dispersant serving as a benchmark for reaching a color strength of at least 115.

Example 2 is a comparative example using tetraethylenepentamine (TEPA) as polyamine A and butylacrylate as linker D. TEPA and butylacrylate are reacted to form substance B. Butylacrylate has two amine reactive groups (one ester group and one Michael acceptor). The resulting adduct B has one amine reactive group as one amine reactive group of butylacrylate reacts with an amine group of TEPA to form substance B. If B has only one amine reactive group, it is required according to the invention that additional linker D and or mixture of B and A is reacted with C for 1 to 10 times. This repeated reaction is depicted as "N" in table 1. As shown in table 1, this reaction was repeated N=0 times in example 2. The required additional reaction of D and/or mixture of B and A to a formed C is not repeated for 1 to 10 times which is necessary because B has only 1 amine reactive group. As a result, the final dispersant according to example 2 does not reach the required color strength F of 115.

Similar to example 2, examples 4 and 5 also using tetraethylenepentamine (TEPA) as polyamine A and butylacrylate as linker D. The difference to example 2 is that the required additional reaction of D and/or mixture of B and A to a formed C is repeated N=1 time (example 4) and N=3 times (example 5). While the product of example 2 does not reach the required color strength, the final dispersants of examples 4 and 5 reach the required color strength F above 115.

Example 3 is a comparative example using diethylenetriamine (DETA) as polyamine and Diethylmaleate as linker. Diethylenetriamine (DETA) does not have the required four amines. The final dispersant does not reach the required color strength F of 115.

Examples 4-11 are examples according to the invention. As can be taken from table 1 the pigment dispersants according to the invention provide the necessary performance with regard to color strength and some even surpass the PEI based dispersant despite having lower amine density than PEI.

The invention claimed is:

1. A pigment dispersant obtained by reacting amine-rich moieties C with at least one polymer P, said polymer P having one or more amine reactive groups,
    wherein said amine-rich moieties C have an amine density of at least 600 mg KOH/g and said amine-rich moieties C are obtainable from repetitive self-reaction of at least one type of substance B and from cross-reaction of at least one B with at least one substance A, wherein the reaction temperature should remain below 230° C.,
    wherein the at least one B is an adduct of the at least one substance A and at least one linker D, and B contains 1-15 amine-reactive groups and 4-15 in total number of primary, secondary, tertiary and quaternary amines,
    wherein the at least one substance A is a branched and/or linear aliphatic and/or cycloaliphatic or aromatic polyamine containing 4-15 total number of primary, secondary, tertiary and quaternary amines,
    wherein the at least one linker D is an acrylate, a maleate/fumarate mono-ester or a maleate/fumarate di-ester containing 1-15 amine-reactive groups, or a mixture thereof;
    wherein the amine-reactive groups in B and D are reacted with reactive amines in B and/or A, and if B has only one amine reactive group then additional D and/or mixture of B and A is reacted to a previously formed C, and wherein such additional reaction of D and/or mixture of B and A to a formed C is repeated for 1 to 10 times.

2. The pigment dispersant according to claim 1, wherein the amine-rich moieties C have an amine density of 600 mg KOH/g to 1,000 mg KOH/g.

3. The pigment dispersant according to claim 2, wherein the amine-rich moieties C have an amine density of 700 mg KOH/g to 1,000 mg KOH/g.

4. The pigment dispersant according to claim 1, wherein the at least one polymer P is a polyester, a polyether, a polyesterether, a poly(meth)acrylate, or a mixture thereof.

5. The pigment dispersant according to claim 1, wherein the at least one polymer P is a polylactone or a polycaprolactone.

6. The pigment dispersant according to claim 1, wherein the at least one substance B has 2 to 15 amine-reactive groups, and
wherein the additional D and/or mixture of B and A is reacted to a previously formed C, wherein such additional reaction of D and/or mixture of B and A to a formed C is repeated for 1 to 10 times.

7. The pigment dispersant according to claim 1, wherein the at least one substance A is at least one selected from the group consisting of triethylenetetramine, tetraethylenepentamine, and pentaethylenehexamine.

8. The pigment dispersant according to claim 1, wherein the reaction product obtained by reacting the amine-rich moieties C with the at least one polymer P is further reacted with at least one substance Q selected from the group consisting of peroxides, alkyl halide, carboxylic acid, carboxylic ester, ketone, aldehyde, epoxide, isocyanate, uretdiones, carbodiimide, Michael acceptors, and anhydride.

9. The pigment dispersant according to claim 8, wherein the at least one substance Q is an anhydride.

10. A process for producing a pigment dispersant according to claim 1, the process comprising:
a) repetitive self-reacting at least one type of substance B and/or cross-reacting at least one B with at least one substance A to produce amine-rich moieties C having an amine density of at least 600 mg KOH/g,
wherein B is an adduct of the at least one substance A and at least one linker D, and B contains 1-15 amine-reactive groups and 4-15 in total number of primary, secondary, tertiary and quaternary amines,
the at least one substance A is a branched and/or linear aliphatic and/or cycloaliphatic or aromatic polyamine containing 4-15 total number of primary, secondary, tertiary and quaternary amines, and
the linker D is an acrylate, a maleate/fumarate mono-ester or a maleate/fumarate di-ester containing 1-15 amine-reactive groups, or a mixture thereof; and
wherein the amine-reactive groups in B and D are reacted with reactive amines in B and/or A, and if B has only one amine reactive group then additional D and/or mixture of B and A is reacted to a previously formed C, wherein such additional reaction of D and/or mixture of B and A to a formed C is repeated for 1 to 10 times; and b) reacting the amine-rich moieties C with at least one polymer P, said polymer P having one or more amine reactive groups.

11. The process for producing a pigment dispersant according to claim 10, wherein the amine-rich moieties C have an amine density of 600 mg KOH/g to 1,000 mg KOH/g.

12. The process for producing a pigment dispersant according to claim 10, wherein the at least one substance B has 2 to 15 amine-reactive groups, and
wherein the additional D and/or mixture of B and A is reacted to a previously formed C, wherein such additional reaction of D and/or mixture of B and A to a formed C is repeated for 1 to 10 times.

13. The process for producing a pigment dispersant according to claim 10, wherein the at least one substance A is at least one selected from the group consisting of triethylenetetramine, tetraethylenepentamine, and pentaethylenehexamine.

14. The process for producing a pigment dispersant according to claim 10, wherein the reaction product of the amine-rich moieties C and the at least one polymer P is reacted with a substance Q selected from the group consisting of peroxides, alkyl halide, carboxylic acid, carboxylic ester, ketone, aldehyde, epoxide, isocyanate, uretdiones, carbodiimide, Michael acceptors, and anhydride.

15. The pigment dispersant according to claim 1, wherein said amine-rich moieties C have an amine density of at least 600 mg KOH/g and said amine-rich moieties C are obtained from repetitive self-reaction of at least one type of substance B and from cross-reaction of at least one B with at least one substance A.

16. The pigment dispersant according to claim 1, which has a color strength of greater than 115.

17. The pigment dispersant according to claim 1, wherein the at least one substance A comprises tetraethylenepentamine (TEPA) and the at least one linker D comprises butyl acrylate, diethyl maleate, or monoethyl maleate.

18. The pigment dispersant according to claim 1, wherein after formation of the C, additional reaction of D and/or mixture of B and A to the formed C is repeated for 1 to 10 times.

19. The pigment dispersant according to claim 1, wherein initially the at least one B is formed as an adduct of the at least one substance A and at least one linker D, and then after formation of the at least one B, C is formed by the repetitive self-reaction and the cross-reaction.

20. The pigment dispersant according to claim 19, wherein polyamine A is added after the formation of the at least one B.

* * * * *